United States Patent
Iwamura

[11] Patent Number: 5,987,214
[45] Date of Patent: *Nov. 16, 1999

[54] APPARATUS AND METHOD FOR DECODING AN INFORMATION PAGE HAVING HEADER INFORMATION AND PAGE DATA

[75] Inventor: Ryuichi Iwamura, Tokyo, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/672,069

[22] Filed: Jun. 26, 1996

[30] Foreign Application Priority Data

Jun. 30, 1995 [JP] Japan .................................. 7-187958

[51] Int. Cl.$^6$ ........................................................ H04N 5/76
[52] U.S. Cl. ............................. 386/95; 386/125; 348/468
[58] Field of Search ............................. 386/46, 111, 112, 386/95, 98, 126, 125, 83; 348/468; 360/5; H04N 5/76

[56] References Cited

U.S. PATENT DOCUMENTS

| | | | |
|---|---|---|---|
| 4,409,670 | 10/1983 | Herndon et al. | 360/5 |
| 5,598,276 | 1/1997 | Cookson et al. | 386/46 |
| 5,684,542 | 11/1997 | Tsukagoshi | 348/468 |
| 5,742,352 | 4/1998 | Tsukagoshi | 348/468 |
| 5,754,729 | 5/1998 | Fujinami | 386/124 |

FOREIGN PATENT DOCUMENTS 0 662 770 A1  7/1995  European Pat. Off. .
0 671 738 A1  9/1995  European Pat. Off. .

*Primary Examiner*—Huy Nguyen
*Attorney, Agent, or Firm*—Frommer Lawrence & Haug, LLP.; William S. Frommer

[57] ABSTRACT

Apparatus and method for decoding pages of subtitle data supplied as information pages which include respective headers and page data (i.e., subtitle character data) which are superimposed on a video signal. Each received information page is stored in a ring-type memory as a respective page therein, and the header of a page stored in memory is detected prior to being pre-read therefrom. The detected header is read from memory a second time and the page data is read from memory at a time in accordance with certain data included in the pre-read header. The page data is decoded and supplied as an output to be combined with the video signal.

23 Claims, 12 Drawing Sheets

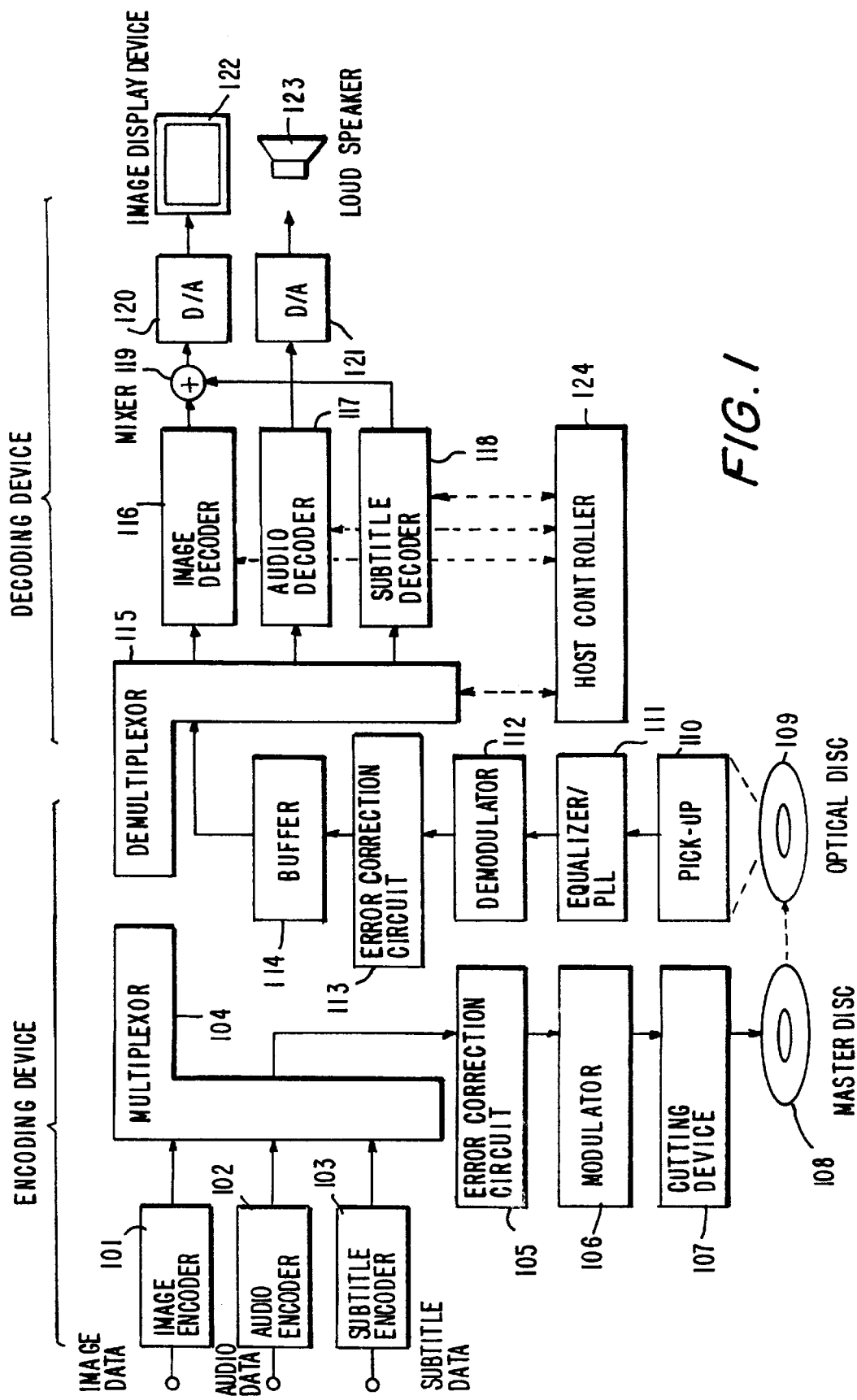

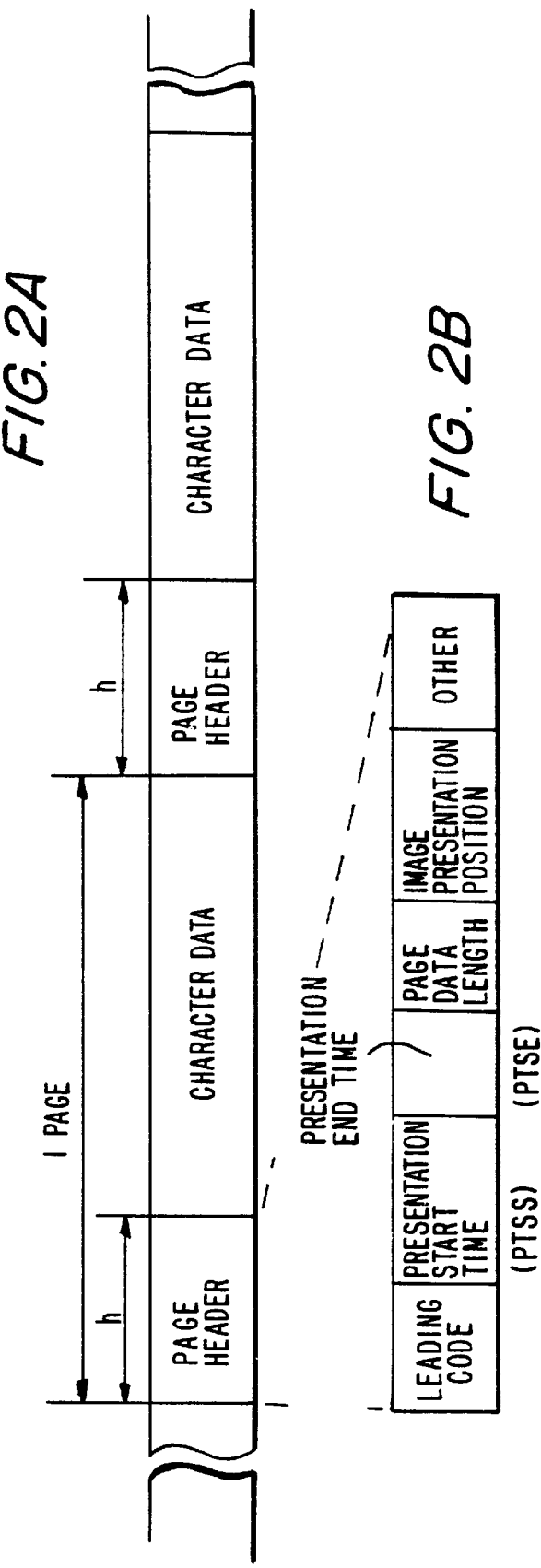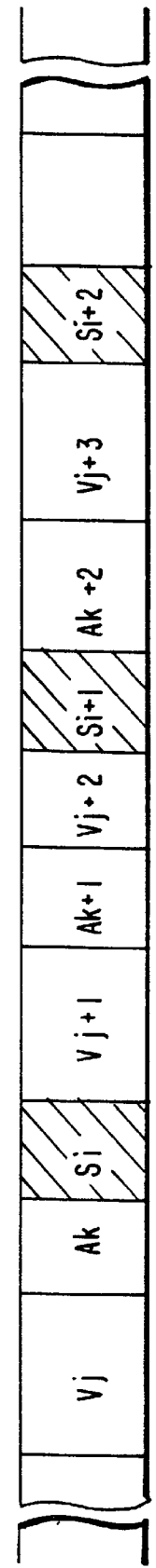

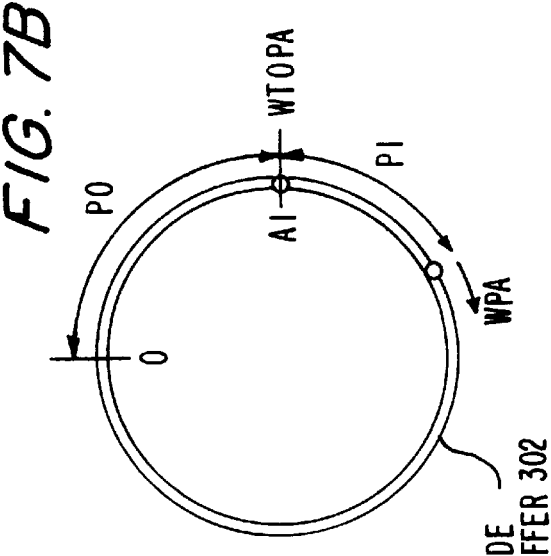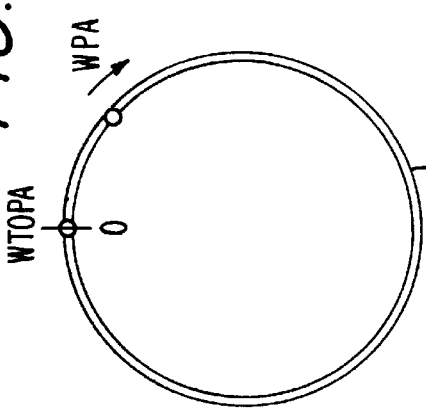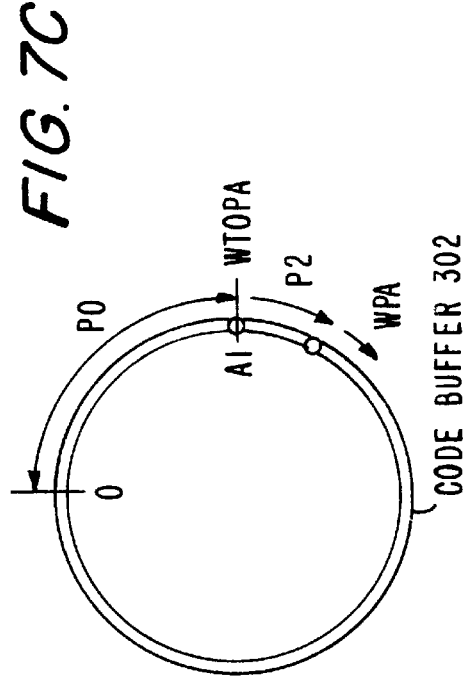

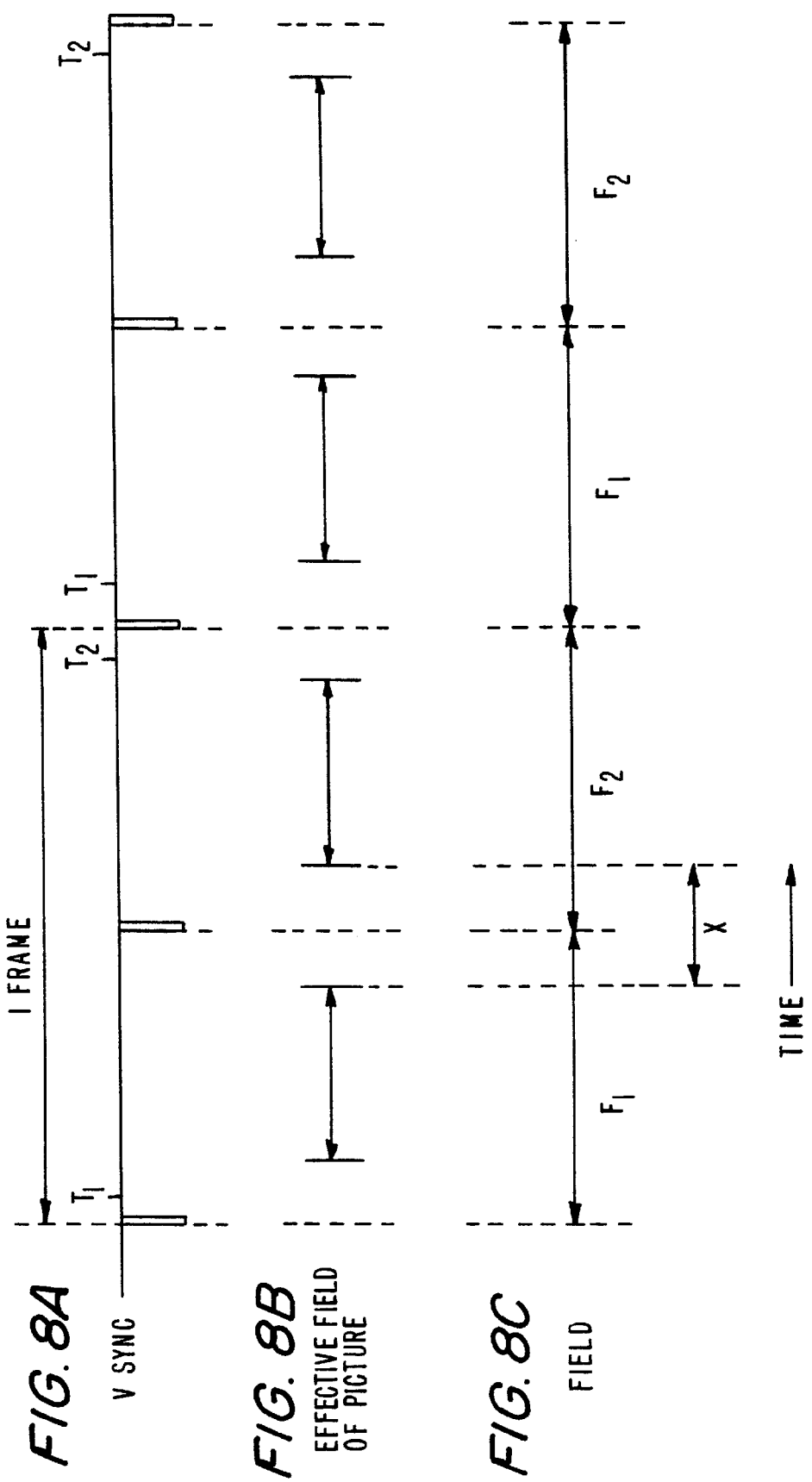

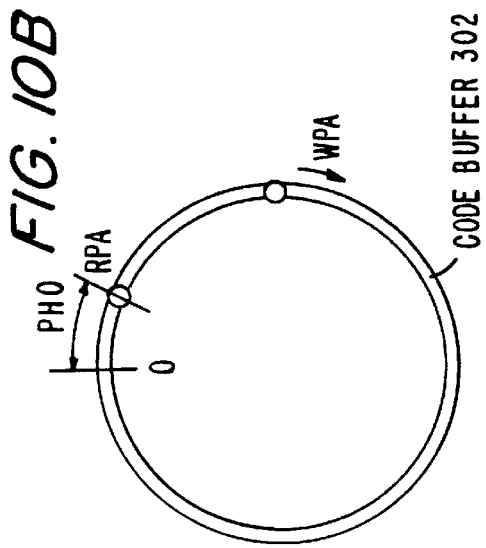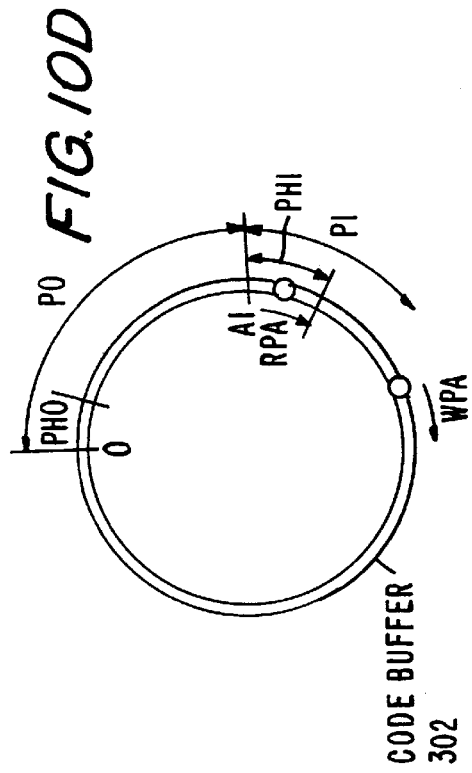

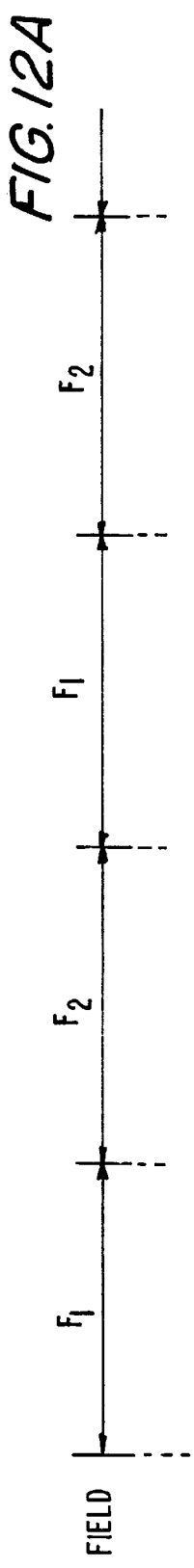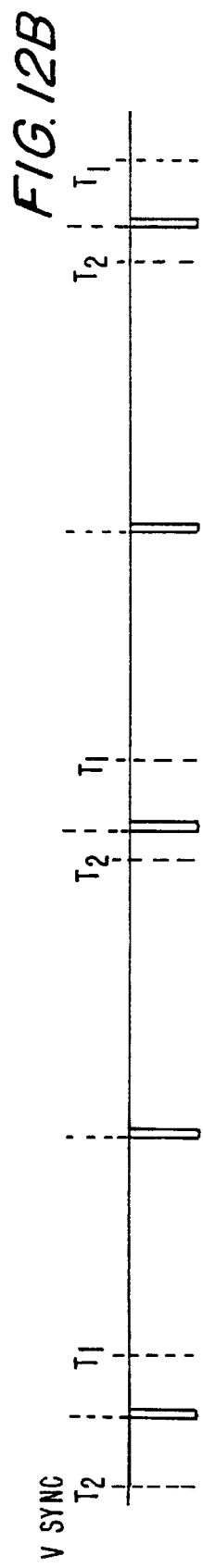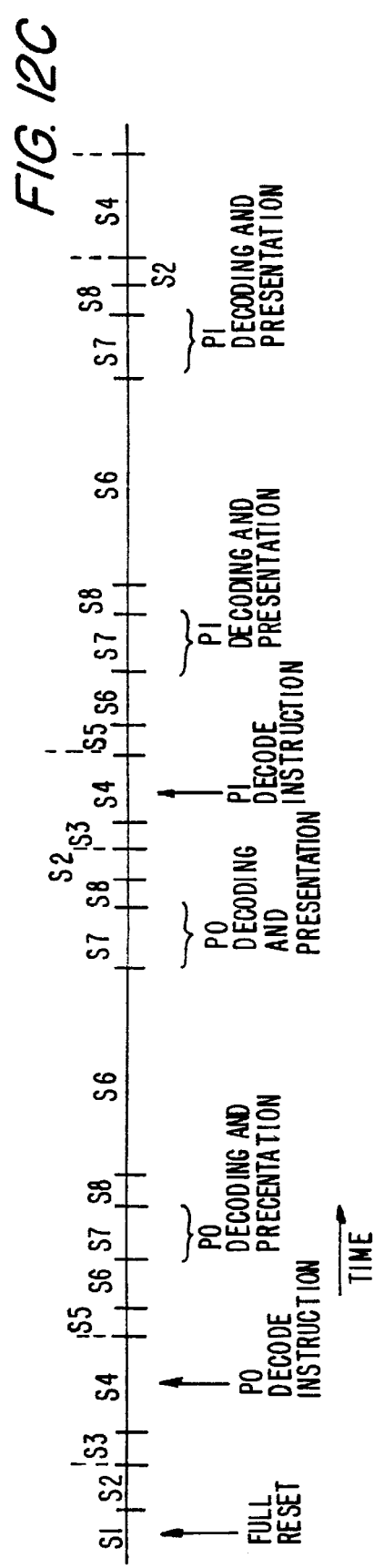

APPARATUS AND METHOD FOR DECODING AN INFORMATION PAGE HAVING HEADER INFORMATION AND PAGE DATA

BACKGROUND OF THE INVENTION

The present invention relates to apparatus and method for decoding an information page having header information and page data and, more particularly, to apparatus and method for decoding a page of subtitle data reproduced from a record medium and including character data representing a subtitle to be superimposed on a video image and a page header which includes, inter alia, subtitle presentation time data.

FIG. 1 is a block diagram of a data encoding device which stores compressed (e.g., MPEG formatted) video, audio and subtitle data on an optical disk and a decoding device which reproduces and decodes the stored video, audio and subtitle data from the optical disk. An encoding device, such as shown in FIG. 1, generally includes an image encoder 101, an audio encoder 102, a subtitle encoder 103, a multiplexer 104, an error correction circuit 105, a modulator 106, and a cutting device 107. Digital image data, digital audio data, and digital subtitle data are supplied to encoders 101, 102 and 103, respectively, which encode the respectively supplied data in a manner well known in the art, and the encoded image, audio and subtitle data are combined in multiplexer 104 and error correction data is added thereto in error correction circuit 105. The data is modulated in circuit 106 and is stored on a master optical disk 108 by means of cutting device 107. Since the operations of each of the circuits 101–107 of the encoding device of FIG. 1 are well known in the art, further description thereof is omitted herein.

An existing decoding device, such as shown also in FIG. 1, generally includes a pick-up circuit 110, a waveform equalizer/PLL circuit 111, a demodulator 112, an error correction circuit 113, a buffer 114, a demultiplexer 115, decoders 116, 117 and 118, a mixing circuit 119, digital-to-analog (D/A) converters 120, 121 and a host controller 124. Data stored in an optical disk 109, which is a distributed copy of master disk 108, is "picked-up" (i.e., reproduced) by pick-up circuit 110 and waveform equalized in circuit 111. A data clock timing signal is generated from the reproduced data by waveform equalizer/PLL circuit 111, the reproduced data is demodulated by demodulator circuit 112, and any errors that occur in the reproduced data are corrected in error correction circuit 113. The demodulated error corrected data is temporarily stored in buffer 114 which supplies the data stored therein to demultiplexer 115 which separates the reproduced data into respective image, audio and subtitle components and which supplies the image, audio and subtitle data to image decoder 116, audio decoder 117 and subtitle decoder 118, respectively. Decoders 116, 117 and 118 decode the respectively supplied data, and the decoded image and subtitle data are combined in mixer 119 prior to being supplied to D/A converter 120. The decoded audio data is supplied to D/A converter 121. D/A converters 120, 121 convert the digital video data (including both image and subtitle data) and the digital audio data, respectively, to respective analog signals which may be displayed and reproduced by, for example, an image display device 122 and a loud speaker 123. As is well known, host controller 124 controls the operations of the various circuits of the decoding device, including decoders 116, 117 and 118 and demultiplexer 115. Except for subtitle decoder 118, the operations of circuits 110–117, 119–121 and 124 of the decoding device shown in block diagram form in FIG. 1 are well known in the art and further description thereof is omitted herein except where necessary for an understanding of the present invention.

FIGS. 2A and 2B illustrate a format of subtitle data stored on an optical disk wherein subtitle information which is superimposed on a video picture is referred to as a "page" and wherein each page usually is comprised of 1 to 3 lines of character information and displayed with the video picture for a time period of several seconds. Referring to FIG. 2A, each page of subtitle data is shown as including a page header having a data amount h followed by character data. Each page header, shown in detail in FIG. 2B, includes a leading code for identifying the page header, PTSS (presentation time stamp start) data which identifies the time at which the subtitle is presented (i.e., displayed), PTSE (presentation time stamp end) data which identifies the superimposition termination time of the subtitle, a page data length which identifies the amount of data included in the page, image presentation position data which identifies the position in the video image at which the subtitle is to be located (e.g., horizontal and vertical positions, height, width, etc.), as well as other information. The length h of each page header is fixed.

The character data of each page represents the subtitle that is displayed on the video picture and includes both character and color information. The character data is either compressed or uncompressed digital data and generally is not constant in length (i.e., data amount).

FIG. 2C illustrates the packet-like structure of the video, audio and subtitle data reproduced from the optical disk, in which each packet of image data ($V_J$, $V_{J+1}$ ...) is followed by a packet of audio data ($A_K$, $A_{K+1}$ ...) which, in turn, is followed by a packet of subtitle data ($S_I$, $S_{I+1}$ ...). Each subtitle data packet S generally does not contain an entire page of subtitle data, and instead, each subtitle page is comprised of plural subtitle packets. Demultiplexer 115, shown in FIG. 1, converts the reproduced digital data having the data structure shown in FIG. 2C to subtitle data having the data structure shown in FIGS. 2A and 2B, and supplies the converted data to subtitle decoder 118.

Host controller 124 synchronously controls decoders 116, 117 and 118 utilizing a reference clock (not shown) so that each subtitle is superimposed on the video picture at a reference clock time equal to the time indicated by the respective presentation start time PTSS until the time indicated by the respective presentation end time PTSE.

FIG. 3 is a block diagram of subtitle decoder 118 which receives pages of subtitle information from demultiplexer 115. Each page of subtitle data is supplied to a header detector circuit 130 which detects and extracts therefrom the page header and supplies the extracted page header to a subtitle controller 131, and supplies the character data to the input terminal of a switch 133. Switch 133 supplies the character data either to a first memory bank 132a via output terminal (a) or to a second memory bank 132b via output terminal (b). Memory banks 132a and 132b are included in a code buffer memory 132 and each has a storage capacity equal to the maximum amount of character data that can be supplied in a single page. Switch 133 is controlled by subtitle controller 131 which controls the switch to supply character data of a first supplied page to first memory bank 132a, which stores the character data therein, and to supply character data of a successively supplied page to memory bank 132b.

Subtitle controller 131 receives from header detector circuit 130 page header data of a supplied page of subtitle data, such page header including presentation start time data PTSS and presentation end time data PTSE, as previously discussed. Subtitle controller 131 supplies the PTSS and PTSE data, as well as other data included in the page header, to host controller 124 which, in response thereto and to the value of the reference clock, supplies a presentation start instruction to subtitle controller 131. In response to the presentation start instruction, subtitle controller 131 controls a second switch 134 to switch its input to that memory bank 132a or 132b containing the appropriate character data. At the same time, the appropriate memory bank is controlled to read out the character data stored therein and to supply the read out character data, via switch 134, to expander circuit 135. The readout character data, if in compressed form, is expanded in circuit 135 and supplied to mixer 119 which superimposes the character data on the video picture. The character data repeatedly is read out from code buffer memory 132, expanded and supplied to mixer 119 until the time identified by presentation end time data PTSE is reached, at which time host controller 124 supplies a presentation end command to subtitle controller 131 which, in response thereto, controls both code buffer memory 132 and switch 134 to terminate the reading out and supplying of the stored character data.

When character data of a first page is being read from, for example, memory bank 132a and being supplied to mixer circuit 119, the page header of the successively supplied page of subtitle data is detected and extracted in circuit 130 and supplied to subtitle controller 131, and the character data of the successively supplied page is stored in the other memory bank, for example, memory bank 132b. When the presentation start time PTSS of the second page is reached, subtitle decoder 118 is ready to read out and supply character data of the second page. At this time, (i.e., while the character data of the second page is read out and supplied to mixer circuit 119) subtitle controller 131 controls switch 133 to switch its output to terminal a so that the character data of a third supplied page is stored in memory bank 132a.

One problem with a subtitle decoder having the block structure shown in FIG. 3 is its general inability to store more than two pages of character data at a time and its general inability to maximize the amount of data that can be stored in its buffer memory. Even if the buffer memory included a third or even a fourth memory bank, such a subtitle decoder still would not maximize memory utilization since each page of subtitle data which has less data than the size of a memory bank still requires the use of an entire memory bank (e.g., memory bank 132a). Moreover, switching between three or more memory banks to provide simultaneous reading and writing therefrom and to is complex.

FIG. 4 is a block diagram of another subtitle decoder 118 in which a "ring" type code buffer 202 is utilized to store pages of character data. Subtitle data output from demultiplexer 115 is supplied to header detector circuit 200 which detects and extracts the page header of each page in a manner similar to that of header detector 130, previously discussed. One page of character data (without the page header) is supplied and stored in code buffer 202 at a "top of page" address therein and the "top of page" address is stored in address register 203. Similar to subtitle controller 131 shown in FIG. 3, subtitle controller 201 supplies the presentation start time data PTSS and the presentation end time data PTSE to host controller 124 and when host controller 124 supplies a presentation start instruction to subtitle controller 201 (when the reference clock value equals the presentation start time PTSS), subtitle controller 201 reads the top of page address from address register 203 corresponding to the particular subtitle to be displayed. The character data is read from code buffer 202 and expanded, if necessary, in expander circuit 204 in a manner similar to that of expander circuit 135, previously discussed. When host controller 124 supplies a presentation end instruction to subtitle controller 201, code buffer 202 is controlled to stop reproducing and supplying the character data stored therein.

At this time, the page header of a successively supplied page of title data is already stored in address register 203 and the character data thereof is stored in code buffer 202. Furthermore, additional pages of subtitle data also may be stored in the subtitle decoder. Subtitle controller 201 supplies to host controller 124 presentation start time data PTSS and presentation end time data PTSE stored in address register 203 corresponding to a subsequent page of subtitle data. Successive pages of character data similarly are read from code buffer 202 in the above described manner.

Although the subtitle decoder of FIG. 4 utilizes a ring type buffer memory which, in theory, maximizes storage capacity of variable length pages of subtitle data, since the page header of each page is stored in address register 203, the maximum number of page headers to be stored therein must be predetermined in order to properly carry out the above discussed operations. In other words, although code buffer 202 itself does not require a predetermined maximum number of pages of subtitle data that can be stored therein, the storage of the page headers in address register 203 requires the maximum number of page headers to be stored therein to be predefined which, in turn, sets a limit to the maximum number of pages of character data that can be stored in the code buffer.

OBJECTS OF THE INVENTION

Therefore, it is an object of present invention to provide apparatus and method for decoding an information page having header information and page data which overcome the shortcomings of the above described devices.

Another object of the present invention is to provide a decoding apparatus which is capable of storing and reproducing successive pages of subtitle data without memory switching.

A further object of the present invention is to provide a decoding apparatus in which the maximum number of pages of subtitle data that can be stored therein is not predetermined.

An additional object of this invention is to provide apparatus and method for decoding an information page in real time without an unnecessarily high operating frequency.

Still another object of the present invention is to provide apparatus and method for decoding a large number of information pages having header information and page data in a relatively simple and uncomplicated manner.

Various other objects, advantages and features of the present invention will become readily apparent to those of ordinary skill in the art, and the novel features will be particularly pointed out in the appended claims.

SUMMARY OF THE INVENTION

In accordance with one embodiment of the present invention, apparatus and method are provided for receiving at least one information page which has header information and page data (e.g., a subtitle to be superimposed on a video image), storing each received information page in a memory (e.g., a ring-type memory) as a respective page therein, detecting the header information stored in one of the pages, reading from memory, a first time, the detected header information, reading from memory, at a time in accordance with the first time read out header information, the detected header information a second time and the stored page data which corresponds to the detected header information, decoding the read out page data, and supplying the decoded read out page data as an output.

As one aspect of the present invention, the page data is read from memory at a time in accordance with presentation time data included in the first time read out header information.

As another aspect of the present invention, the detected header information of a successively stored page is read from memory at a time period outside the effective field of a video image in which the decoded page data is combined.

As a further aspect of the present invention, in response to a half reset instruction, newly received information pages are stored over every page stored in the memory except the page data currently being read therefrom.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIG. 1 is a block diagram of an encoding and decoding device which stores and reproduces digital video, audio and subtitle data to and from an optical disk in which the present invention may be applied;

FIGS. 2A and 2B illustrate the data structure of subtitle data, and FIG. 2C illustrates the packet-type data structure of the video, audio and subtitle data stored on an optical disk;

FIGS. 7A to 7C schematically illustrate the locations in the code buffer memory of the subtitle decoder of the present invention at which pages of subtitle data are stored;

FIGS. 8A to 8C are timing diagrams illustrating the relationship between the effective field of each image and the time at which subtitle data is supplied in accordance with the present invention;

FIGS. 10A to 10D schematically illustrate the locations in the code buffer memory from which pages of subtitle data are read in accordance with the present invention;

FIGS. 12A–12C are timing diagrams showing the relationship between video fields, video synchronization signals and the states of the subtitle decoder.

DETAILED DESCRIPTION OF CERTAIN PREFERRED EMBODIMENTS

Figure 5:
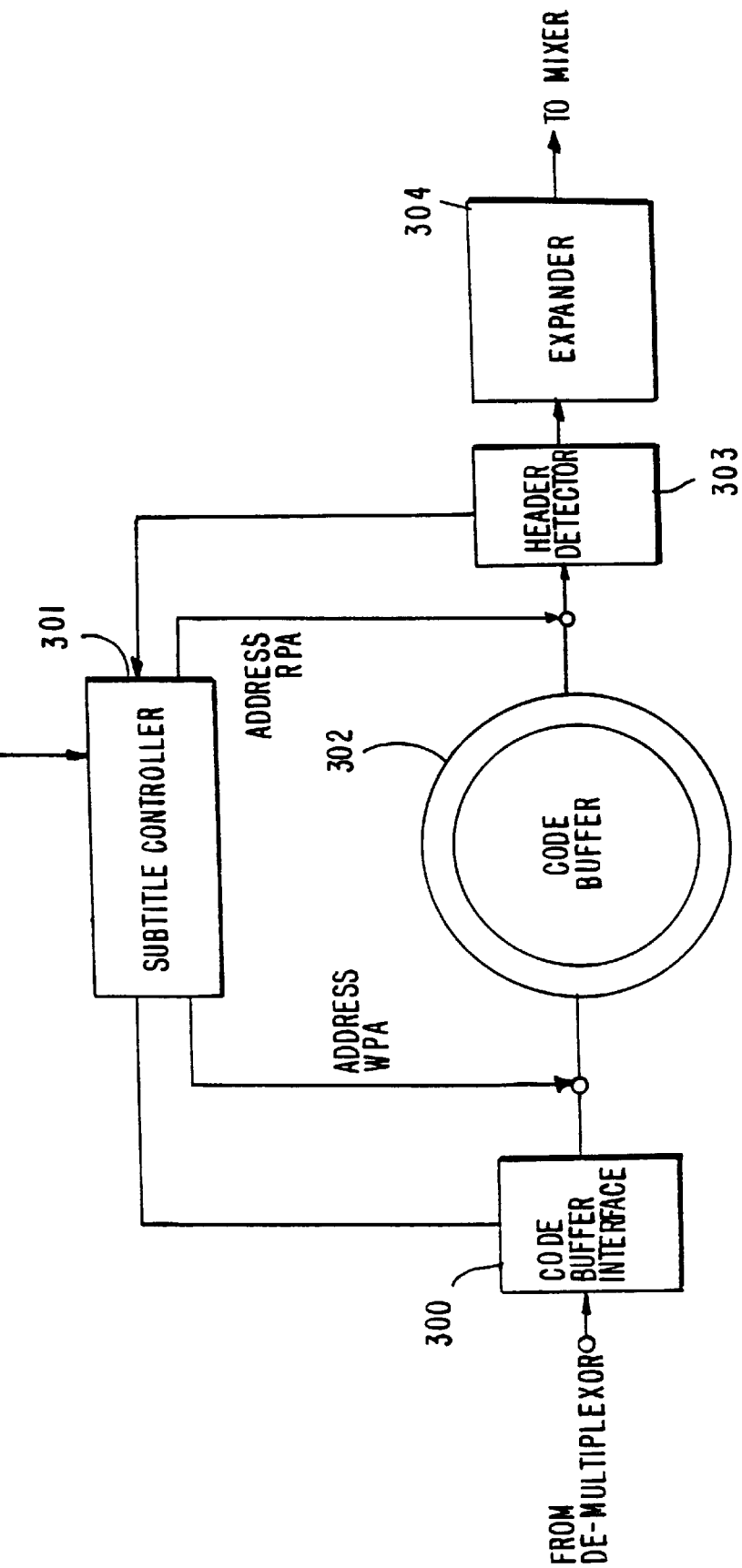
FIG. 5 is a block diagram of a subtitle decoder in accordance with the present invention.

Referring now to FIG. 5 of the drawings, a block diagram of a subtitle decoder in accordance with the present invention for use in the decoding device of FIG. 1 is shown. As shown, the subtitle decoder of the present invention is comprised of a code buffer interface 300, a subtitle controller 301, a code buffer 302, a header detector 303 and an expander 304. Pages of subtitle data supplied from demultiplexer 115 (FIG. 1) are input to code buffer interface 300 which supplies each page of subtitle data to code buffer 302 which successively stores the pages therein. Data stored in code buffer 302 is read out and supplied to header detector 303 which detects the existence of a header (i.e., page header) in the stored page of subtitle data and which supplies the presentation start time data PTSS and presentation end time data PTSE included in the detected header to subtitle controller 301. Subtitle controller 301 supplies the PTSS and PTSE data to host controller 124 in a manner similar to that performed by subtitle controllers 131 and 201, previously discussed.

Figure 6:
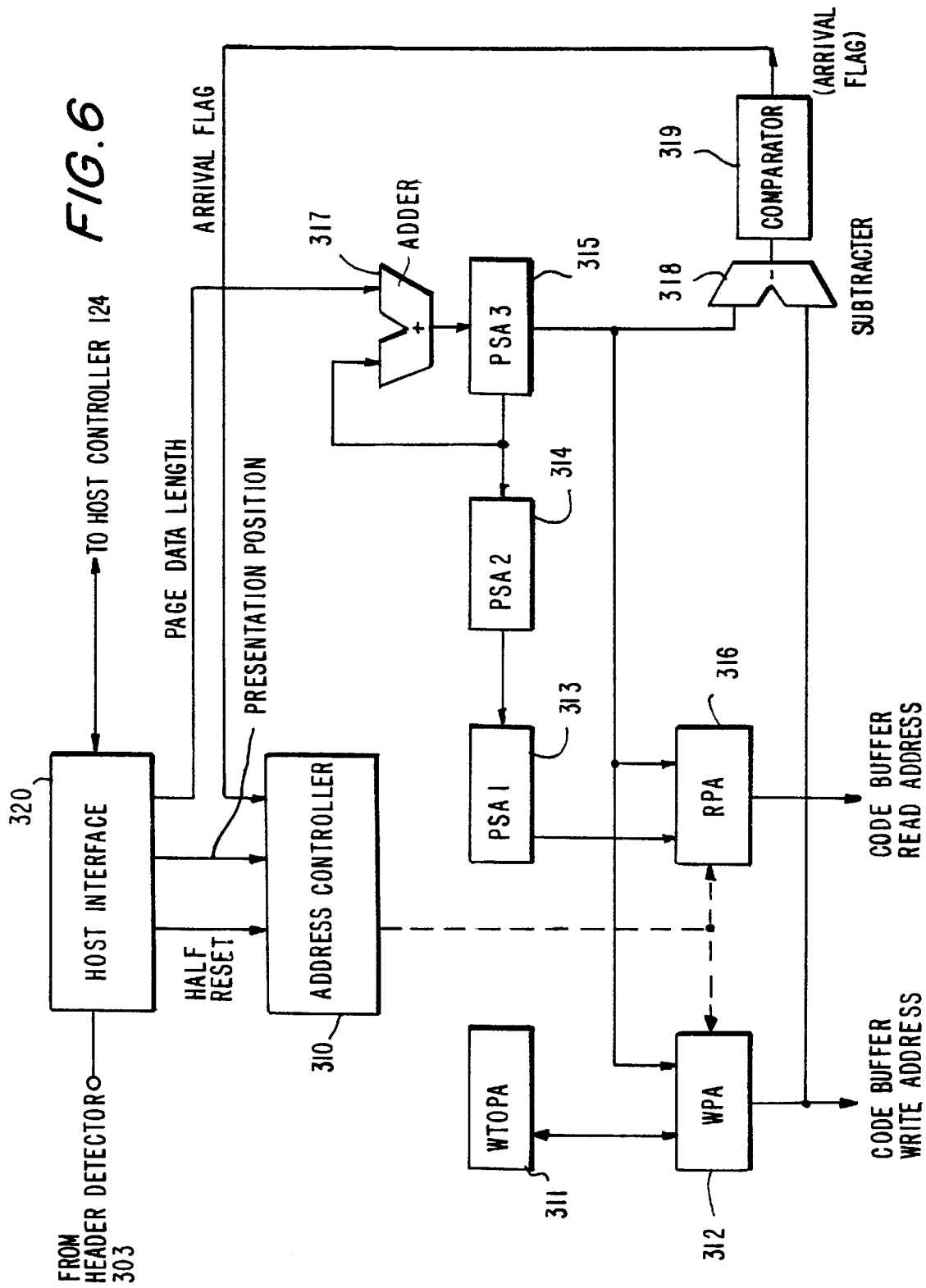
FIG. 6 is a block diagram of the subtitle controller 301 shown in FIG. 5 in accordance with the present invention.

Subtitle controller 301 supplies as outputs a write pointer address WPA, which represents the address in code buffer 302 at which a page of subtitle data is to be stored, and a read pointer address RPA, which identifies the address in code buffer 302 from which data is to be read. FIG. 6 is a detailed block diagram of subtitle controller 301 and is shown as including an address controller 310, memory registers 311–316, an adder circuit 317, a subtractor circuit 318, a comparator 319 and a host interface 320.

Prior to supplying page data to code buffer interface 300, or after the occurrence of a reset operation, memory register 311, which stores the "write top of page address" (WTOPA), and memory register 312, which stores the write pointer address WPA, are reset to zero, that is, to the beginning memory address in code buffer 302. The write top of page address WTOPA identifies the beginning memory location in code buffer 302 at which a page of subtitle data is to be stored, and write pointer address WPA is the memory address in code buffer 302 at which the next supplied data (e.g., byte) is to be stored. As code buffer interface 300 supplies to code buffer 302 a page of subtitle data, write pointer address WPA increases in value in response to a control signal supplied from address controller 310 such that the data of the supplied page is successively stored in code buffer 302, and which is schematically illustrated in FIG. 7A. Upon completion of the storage in code buffer 302 of the first page of subtitle data and the receipt by code buffer interface 300 of the next supplied page of subtitle data, code buffer interface 300 supplies a control signal to subtitle controller 301 which indicates the receipt of a new page, and in response thereto, subtitle controller 301 stores in memory register 311 (WTOPA) the address of code buffer 302 that immediately follows the last stored byte of data of the first page of subtitle data and this address is stored as write pointer address WPA (i.e., in register 312). As the second page of subtitle data is supplied to code buffer 302, write pointer address WPA is incremented so that the second page is successively stored therein, as illustrated in FIG. 7B. As shown, the first page of subtitle data, identified as page "P0", in code buffer 302 is immediately followed by the second page P1 of subtitle data, wherein the write top of page address WTOPA (register 311) identifies the top (i.e., beginning) address of the second page P1, also identified herein as address A1.

FIG. 7C illustrates the contents of code buffer 302 and the values of write top of page address WTOPA and write pointer address WPA when an error has occurred during the storage in code buffer 302 of page P1. When such an error occurs, presumably, an uncorrectable error, or when an error flag included in the header of a supplied page identifies that page as being corrupted, address controller 310 (FIG. 6) supplies a control signal to WPA register 312 so as to cause write top of page address WTOPA to be stored as write pointer address WPA which results in the storage of page P2 at a location in the code buffer memory that immediately follows page P0. Thus, page P1 in code buffer 302 is overwritten by page P2.

The above-mentioned error can occur in any other number of ways, as is well known in the art. Further, detection of such an error may be achieved in any number of manners well known in the art, including, but not limited to, the detection of an error flag included in the supplied page of subtitle data, receiving a separate error signal that indicates that the supplied page is erroneous, detecting errors in the supplied page using error detection and correction code contained therein, etc. Thus, removal from code buffer 302 of an erroneous page of subtitle data is easily achieved and without any adverse affect on the reading of subtitle data from code buffer 302, as will be discussed.

As previously mentioned, the header of page P0 is read from code buffer 302 and detected by header detector 303 which supplies presentation start and end times PTSS and PTSE included therein to subtitle controller 301. These operations, as well as the operation of reading from code buffer 302 the character data of each page, will now be discussed in greater detail with reference to FIGS. 8–12 of the drawings and Tables 1–3. In accordance with the present invention, data is written to code buffer 302 during a first of four clock periods and data is read therefrom during the remaining three clock periods, wherein such four clock periods is referred to as a "cycle". However, it is appreciated that such an allocation of time to the reading and writing operations can be varied, as is well known in the art.

Referring back to FIG. 6, subtitle controller 301 includes a memory register 313, which stores the page start address PSA1 of a first page, a memory register 314, which stores the page start address PSA2 of a second page, a memory register 315, which stores the page start address PSA3 of a third page, and a memory register 316 which stores read pointer, address RPA, which, as previously mentioned, identifies the address in code buffer 302 from which data is read. Prior to reading any data from code buffer 302, or when a reset operation occurs, the values of registers 313–316 are reset to the first address location of code buffer 302 (e.g., zero).

Figure 3:
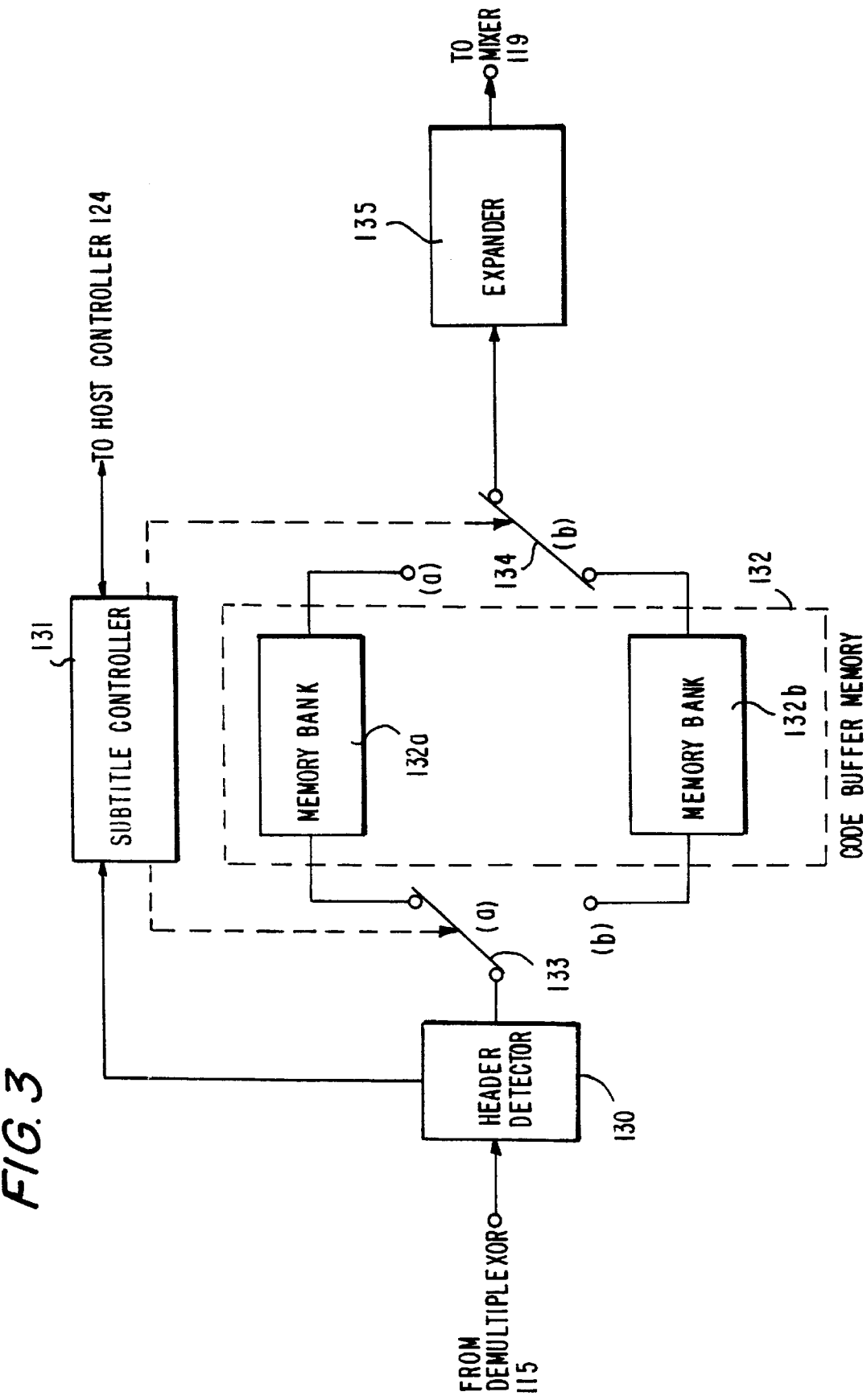
FIG. 3 is a block diagram of a known subtitle decoder.
Figure 4:
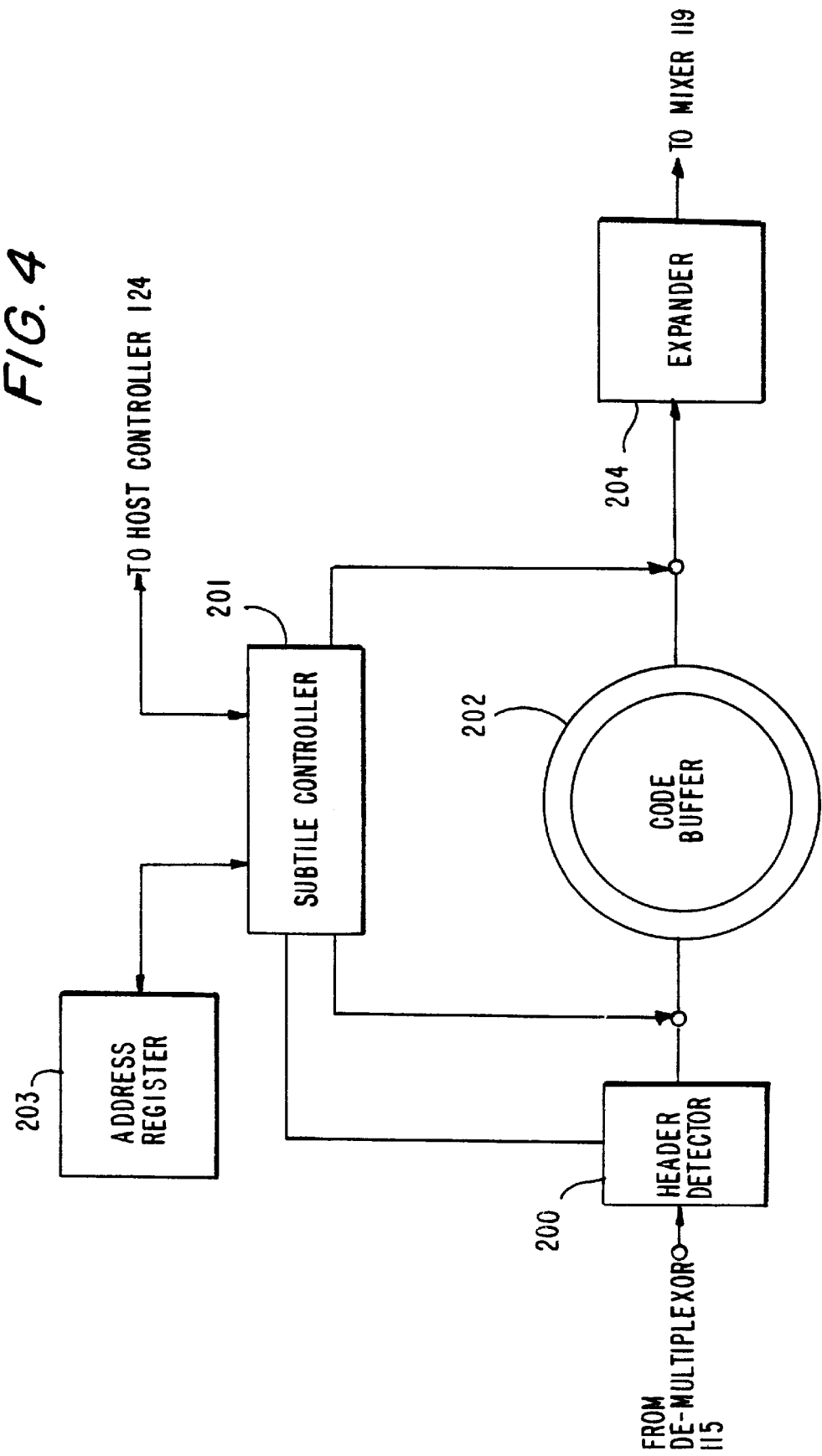
FIG. 4 is a block diagram of another known subtitle decoder.

Upon receiving an appropriate instruction from subtitle controller 301, to be discussed, code buffer 302 reads and supplies the page header and character data of each page stored therein via header detector circuit 303 to subtitle controller 301 and expander 304, respectively. Expander 304 expands the character data, if it is compressed, in a manner similar to that described above with respect to expander circuit 204 (FIG. 4). Expander 304 supplies the expanded character data to mixer 119, shown in FIG. 1, which combines the character data and decoded image data supplied from image decoder 116 and supplies the combined output to D/A converter 120. The operations of expander 304, as well as mixer 119, image decoder 116 and D/A converter 120 are well known in the art, and therefore further description thereof is omitted herein.

Character data of a page stored in code buffer 302 is read out in "real" time. In other words, the read out character data is immediately expanded and combined with the video image without any delay therebetween. Since character data is read from code buffer 302 in such real time, the page header of a successively stored page in code buffer 302 cannot be read therefrom during the time at which the character data is combined with (i.e., superimposed on) the video picture. Furthermore, since a subtitle can be located anywhere within the "effective" field of the video picture, in accordance with the present invention, the page header of a successively stored page is "pre-read" from code buffer 302 during a time which is "outside" the effective field of the video image to avoid affecting the real time reading of the character data.

FIGS. 8A to 8C are timing diagrams illustrating the relationship between the vertical synchronization signals of the video signal and the effective field of each field F1 and F2 of each video frame. As shown in FIGS. 8A and 8B, times T1 and T2 represent times at which the first and second fields, respectively, of each frame are not effective. Furthermore, the time represented by "x" also represents a period of time which is "outside" the effective field of the video picture (to be further discussed).

Figure 9:
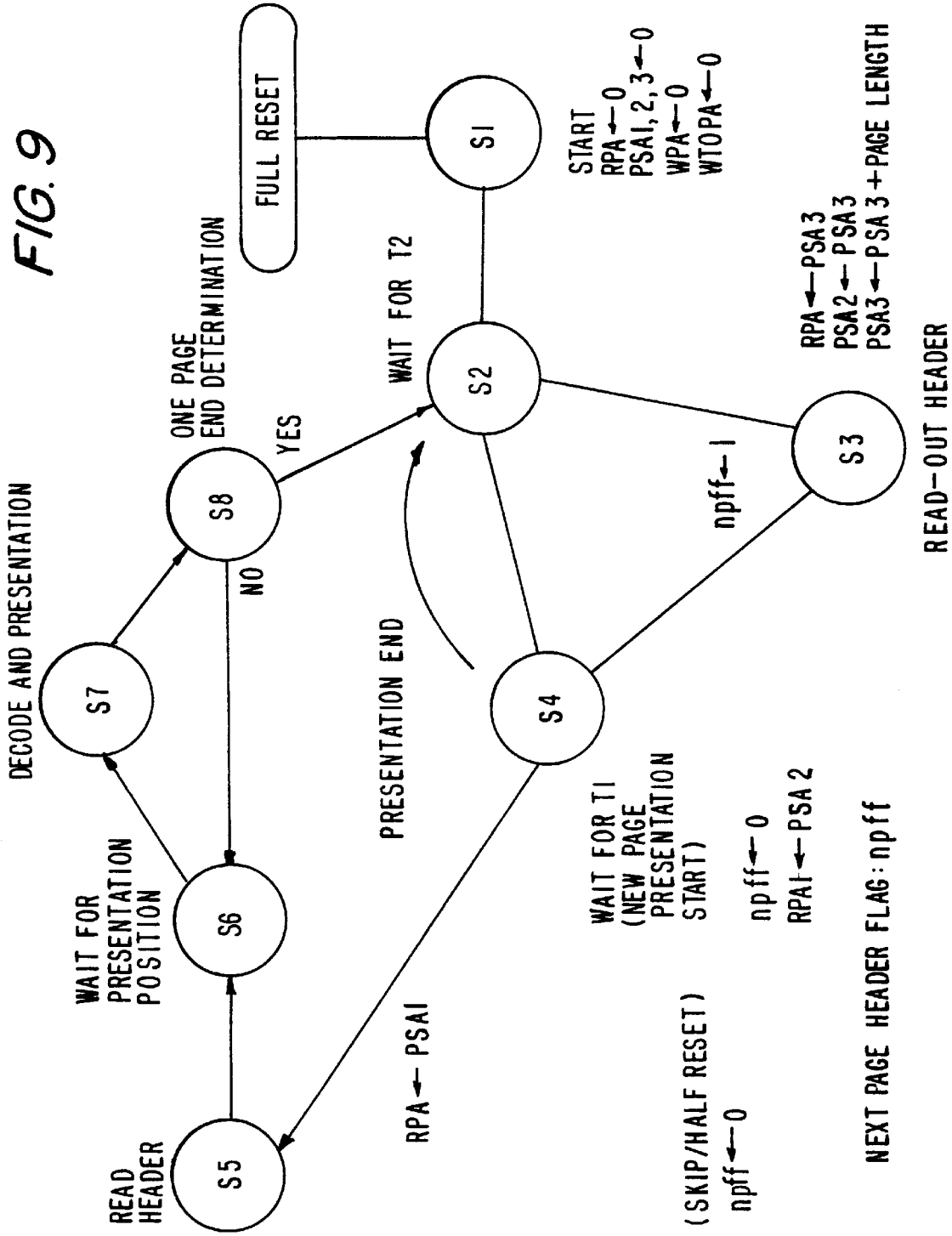
FIG. 9 is a state transition diagram illustrating the operation of the subtitle decoder of the present invention.

FIG. 9 is a state transition diagram showing the various states of the subtitle decoder of the present invention. After a full reset operation, the subtitle decoder enters state S1 at which time read pointer address RPA, page start addresses PSA1, PSA2 and PSA3, write pointer address WPA, and write top of page address WTOPA are reset to zero (i.e., the first address location in code buffer 302). Referring back to FIG. 6, the values of write pointer address WPA and page start address PSA3 are supplied to subtractor circuit 318 which calculates the difference therebetween and which supplies the difference value to comparator 319 which compares the difference value to the amount of data h included in a page header thus determining whether a page header fully is stored in code buffer 302. The output of comparator 319, identified herein as an "arrival flag", is supplied to address controller 310. When the arrival flag indicates that the page header of a supplied page of subtitle data is stored in code buffer 302, the subtitle decoder enters state S2.

In state S2, the subtitle decoder waits until time T2, shown in FIG. 8A, arrives at which time the subtitle decoder enters either state S3 or state S4, as will be discussed. In other words, the subtitle decoder remains in state S2 until the video signal is outside the effective field of the picture. State S3 is entered when the arrival flag is "1" (i.e., the page header of the next supplied page is fully stored in code buffer 302) but that page header (of the next page) has not yet been read from code buffer 302. On the other hand, a transition is made from state S2 to state S4 when the page header of the next supplied page has already been read from code buffer 302, as will be discussed.

Upon entering state S3, page start address PSA3 (register 315) is stored as page start address PSA2 (register 314) and also is stored as read pointer address RPA (register 316). Read pointer address RPA then is incremented until the entire page header is read from code buffer 302, and such a first time reading from code buffer 302 of the page header is identified herein as "pre-reading" the page header. The presentation start and end times PTSS and PTSE included in the pre-read page header are supplied to host controller 124, and the length (i.e., data amount) of the currently read out page is supplied from host interface 320 to adder 317 which adds this page data length value and the current value stored in register 315 so as to ascertain the address location in code buffer 302 of the successively stored page of subtitle data, which value is stored in register 315. Upon reading the entire page header from code buffer 302, the subtitle decoder enters state S4, at which time, a "next page" header flag is set to "1" to indicate that the page header has been pre-read from code buffer 302.

The subtitle decoder then remains in state S4 until time T1, shown in FIG. 8A, is reached, at which time, the next page header flag is reset to 0 and when a subtitle is to be superimposed on the video picture, a transition is made from state S4 to state S5. On the other hand, a transition is made to state S2 when no subtitle is to be superimposed on the video picture (e.g., at the termination time of the current subtitle). In addition, the value of page start address PSA2 (register 314) is stored as the value of page start address PSA1 (register 313) when a subtitle read from code buffer 302 is displayed for the first time. Still further, the value of page start address PSA1 (register 313) is stored as read pointer address RPA (register 316) when there is a transition from state S4 to either state S2 or state S5.

In state 5, read pointer address RPA is incremented so that the page header stored in code buffer 302 at address PSA1 is read therefrom. Presentation position information, previously discussed, included in the page header is supplied to address controller 310 and a transition is made from state S5 to state S6. In state S6, the subtitle decoder is delayed until the video signal output from image decoder 116 represents the location in the video image on which the subtitle is to superimposed, at which time, a transition is made from state S6 to state S7.

In state S7, read pointer address RPA is incremented so that character data of the stored page is read from code buffer 302 and supplied to expander 304 (previously discussed), and when the reproduced subtitle is decoded and superimposed on the video picture, a transition is made from state S7 to state S8.

In state S8, the subtitle decoder determines whether an entire frame (i.e., both fields) has been reproduced, and if so, a transition is made from state S8 to state S2. On the other hand, if only one of the two video fields has been reproduced, a transition is made from state S8 to state S6, whereupon the character data is again read from code buffer 302 and superimposed on the second field of the frame (in state S7).

It is clear from the above discussion that transitions to state S2, S4, S5, S6, S7, S8, S6, S7, S8, S2 are made for each video frame that a subtitle page is to be superimposed. Furthermore, a transition is made from state S2 to state S3 when a new subtitle page is to be presented, or when a skip or half reset instruction is executed (to be discussed), such transition resulting in the reading from code buffer 302 of a new page header (i.e., a page header of a successively stored page of subtitle data).

Referring now to FIGS. 10A to 10D and 11A to 11D of the drawings, the contents of code buffer 302 and the values of read pointer address RPA and write pointer address WPA after various operations of the subtitle decoder of the present invention are schematically illustrated. Furthermore, table 1, shown below, shows the address values of read pointer address RPA and page start addresses PSA1, PSA2 and PSA3, wherein h indicates the fixed length of each page header and the symbol "*" represents that the value in the respective register is unchanged from that of the previous state.

TABLE 1

ADDRESS REGISTER VALUES

| | state | RPA | PSA1 | PSA2 | PSA3 | |
|---|---|---|---|---|---|---|
| | S1 | 0 | 0 | 0 | 0 | |
| | S2 | * | * | * | * | |
| | S3 | * | * | * | * | |
| | | 1 | * | * | * | |
| | | 2 | * | * | * | |
| | | .. | * | * | * | outputting PTSS and PTSE for PH 0 |
| | | .. | * | * | A1 | |
| P0 decode instruction | S4 | h | * | * | * | |
| | S5 | 0 | * | * | * | |
| | | 1 | * | * | * | |
| | | 2 | * | * | * | |
| | | .. | * | * | * | |
| | S6 | h | * | * | * | |
| | S7 | * | * | * | * | P0 decoding and presentation (F1 field) |
| | | h + 1 | * | * | * | |
| | | .. | * | * | * | |
| | S8 | .. | * | * | * | |
| | S6 | .. | * | * | * | |
| | S7 | .. | * | * | * | P0 decoding and presentation (F2 field) |
| | S8 | A1 | * | * | * | |
| | S2 | * | * | * | * | |
| | S3 | A1 | * | A1 | * | |
| | | A1 + 1 | * | * | * | |
| | | .. | * | * | * | outputting PTSS and PTSE in PH 1 |
| | | .. | * | * | A2 | |
| | S4 | A1 + h. | * | * | * | |
| | S5 | 0 | * | * | * | |
| | | .. | * | * | * | |
| | S6 | h | * | * | * | |
| | S7 | * | * | * | * | P0 decoding and presentation (F1 field) |
| | | .. | * | * | * | |
| | S8 | .. | * | * | * | |
| | S6 | .. | * | * | * | |
| | S7 | .. | * | * | * | P0 decoding and presentation (F2) |
| | S8 | A1 | * | * | * | |
| | S2 | * | * | * | * | |

TABLE 1-continued

ADDRESS REGISTER VALUES

|  | state | RPA | PSA1 | PSA2 | PSA3 |  |
|---|---|---|---|---|---|---|
| P1 decode instruction | S4 | * | * | * | * |  |
|  | S5 | * | A1 | * | * |  |
|  |  | A1 + 1 | * | * | * |  |
|  |  | A1 + 2 | * | * | * |  |
|  |  | . . | * | * | * |  |
|  | S6 | A1 + h | * | * | * |  |
|  | S7 | * | * | * | * | P1 decoding and presentation (F1 field) |
|  |  | A1 + h + 1 | * | * | * |  |
|  |  | . . | * | * | * |  |
|  | S8 | . . | * | * | * |  |
|  | S6 | . . | * | * | * |  |
|  | S7 | . . | * | * | * | P1 decoding and presentation (F2 field) |
|  |  | . . | * | * | * |  |
|  | S8 | A2 | * | * | * |  |
|  | S2 | * | * | * | * |  |
|  | S3 | A2 | * | A2 | * |  |
|  |  | A2 + 1 | * | * | * |  |
|  |  | . . | * | * | * | outputting PTSS and PTSE for PH2 |
|  |  | . . | * | * | A3 |  |
| P2 decode instructions | S4 | A2 + h | * | * | * |  |
|  | S5 | A2 | A2 | * | * |  |
|  |  | A2 + 1 | * | * | * |  |

As shown in Table 1, the values of RPA, PSA1, PSA2 and PSA3 are reset to 0 in state S1. A first page P0 of subtitle data is stored in code buffer 302 as write pointer address WPA increases in value and when the page header PH0 of the first page P0 is written in code buffer 302, which contents is illustrated in FIG. 10A, a transition is made from state S1 to state S2. The values of read pointer address RPA and page start addresses PSA1, PSA2 and PSA3 remain unchanged in state S2, but when a transition is made from state S2 to state S3, the value of read pointer address RPA is increased from 0 to h, at which time, the page header PH0 of the first page is read from code buffer 302, such as shown in FIG. 10B. Also, in state S3, the presentation start and end times PTSS and PTSE included in page header PH0 are supplied to host controller 124 and the page data length A1 of the first page P0, also included in page header PH0, is added to the current value of page start address PSA3 to produce the new value of page start address PSA3, as shown in Table 1, which identifies the address in the code buffer at which the next page P1 is stored.

Upon reading header PH0 from code buffer 302, a transition is made from state S3 to state S4, at which time read pointer address RPA is equal to h, the constant length of each page header, and if a presentation instruction (i.e., a P0 decode instruction) is not supplied from host controller 124, a transition is made from state S4 to state S2, as shown in FIG. 9. If, on the other hand, a P0 decode instruction is supplied, a transition is made from state S4 to state S5 whereat read pointer address RPA is reset to 0, and then incremented until it reaches the value of h, as shown in Table 1. As the value of RPA increases during state S5, page header PH0 is read from code buffer 302 a second time and when page header PH0 is fully read from code buffer 302, a transition is made from state S5 to state S6 and then to state S7 in the manner previously discussed with reference to FIG. 9. The value of read pointer address RPA then is incremented by 1 from the value h to the value A1 in state S7 so that the character data of page P0 stored in code buffer 302 is read therefrom, as shown in FIG. 10C. Transitions then are made to state S8, state S6, state S7 and back to state S8 in the manner previously discussed. A transition then is made to state S2, at which time, read pointer address RPA is equal to the value A1, that is, the address in code buffer 302 at which page P1 is stored.

Although not shown in Table 1, the above discussed transitions from state S2 to state S4 to state S5 . . . to state S8 are repeated each time the subtitle of page P0 is superimposed on a successive video frame. When the superimposition of the subtitle of page P0 is terminated, the state of the subtitle decoder of the present invention alternates between state S4 and state S2, as previously discussed, until the arrival flag is "1" which identifies when the page header PH1 of P1 is fully stored in code buffer 302. At this time, a transition is made from state S2 to state S3 whereat the value A1 stored as page start address PSA3 is stored as both read pointer address RPA and page start address PSA2, as shown in Table 1. In state S3, read pointer address RPA is increased from A1 to the value A1+h and page header PH1 of page P1 is read from code buffer 302, as shown in FIG. 10D.

Since page header PH1 is not read from code buffer 302 until the output of comparator 319, shown in FIG. 6, indicates that page header PH1 is stored in code buffer 302, code buffer 302 is never empty. Furthermore, since header PH1 is read from code buffer 302 in a time period which is outside the effective field of the video picture, such "pre-reading" of page header PH1 occurs without any adverse influence on the real time reading and presentation of the subtitle of page P0. Still further, since only the page header of a subsequent page of subtitle data stored in code buffer 302 is "pre-read" the "access" bandwidth of code buffer 302 is not substantially increased.

Upon pre-reading of page header PH1 from code buffer 302, a transition is made from state S3 to state S4 and then to state S5, whereat header PH0 is again read from code buffer 302. The subtitle of page P0 then is again superimposed on the video picture in state S7.

Figure 11A:
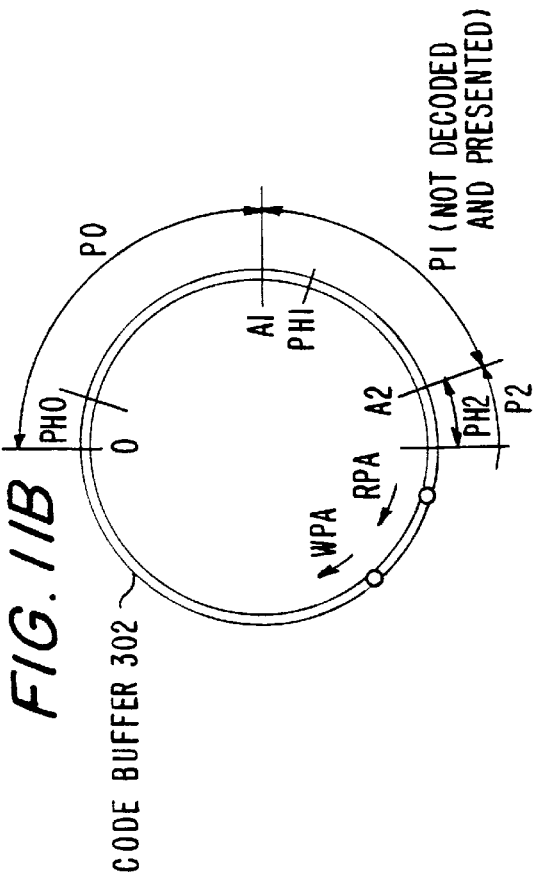
FIGS. 11A–11D schematically illustrate the locations in the code buffer memory from which pages of subtitle data are read during various operations of the subtitle decoder of the present invention.

When a P1 decode instruction is supplied by host controller 124, the address value A1 is stored as the page start address PSA1 in state S5, as shown in Table 1, and page header PH1 and character data of page P1 are read in states S5 and S7, respectively, as shown in FIG. 11A.

Table 1 further illustrates the values of RPA, PSA1, PSA2 and PSA3 when a third page P2 of subtitle data is read from code buffer 302.

FIGS. 12A to 12C are timing diagrams illustrating the relationship between the fields F1 and F2 of the video signal, the vertical synchronization signals of the video signal, and the states of the subtitle decoder of the present invention at particular points in time of the video signal. As shown, a full reset operation results in a transition to state S1 and then to state S2, and at time T2, a transition is made to state S3 whereat a page header is pre-read from code buffer 302. If a P0 decode instruction is received from host controller 124 during state S4, a transition is made to state S5 at time T1, and then to states S6 and S7, at which time character data is read from code buffer 302 and superimposed on field F1 of the video signal. Reading of character data from code buffer 302 is carried out in a similar fashion during the output of field F2 of the video signal. Then, at time T2, if page header PH1 already is stored in code buffer 302, a transition is made to state S3 and page header PH1 is pre-read from code buffer 302. Thus, the pre-reading of a page header of a subtitle page to be subsequently displayed is accomplished at a time at which the video signal is outside the effective field of the video picture. The decoding (i.e., reading) and presentation of subtitle page P1 is carried out in a manner similar to that to the decoding and presentation of subtitle page P0, as shown in FIG. 12C. It is noted that states S3 and S8 in FIG. 12 have been enlarged, and such states generally are relatively short and usually occur in a time period less than 1 horizontal line interval of the video signal.

Figure 11B:
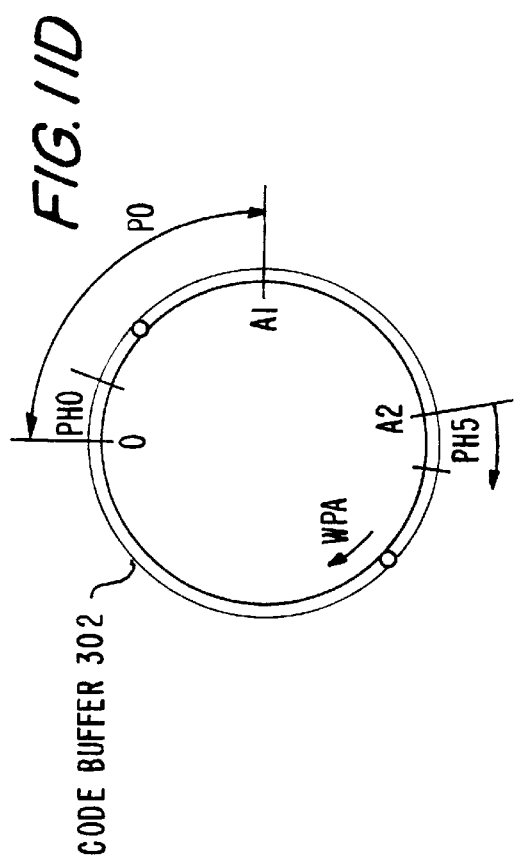
Figure 11C:
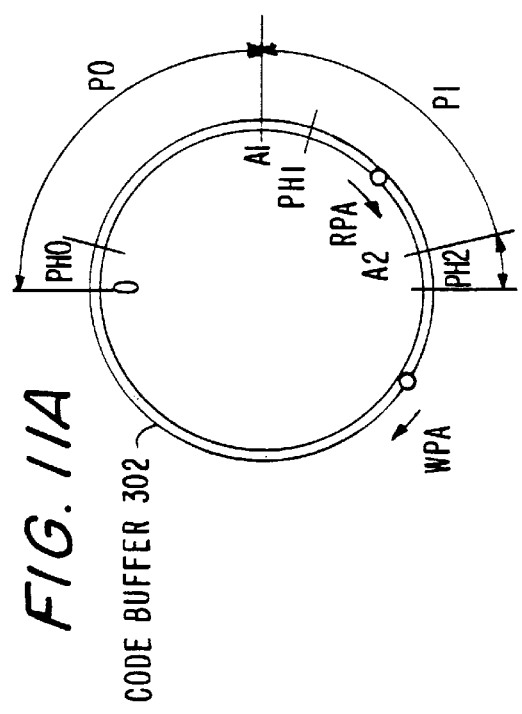
Figure 11D:
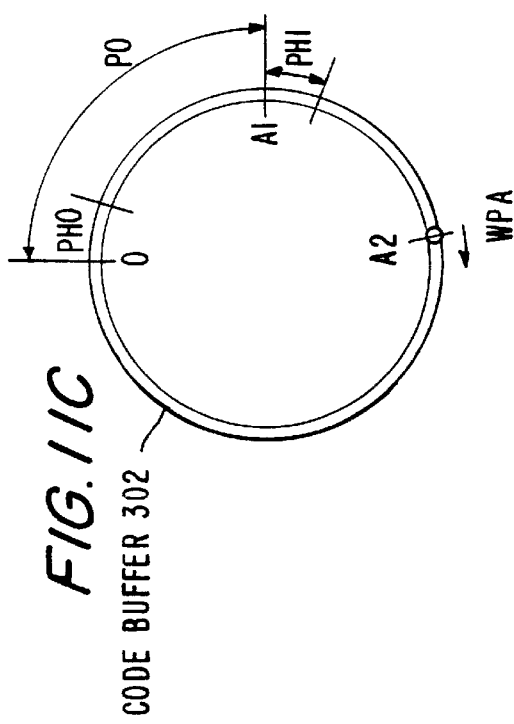

"Skip" and "half reset" operations in accordance with the present invention will now be described with reference to FIGS. 11B to 11D of the drawings and Tables 2 and 3, shown below. During various non-normal playback operations, for example, fast forward reproduction, pages of subtitle data stored in code buffer 302 are not successively read therefrom and superimposed on the video picture. The "skip" operation results in the discarding of the next subtitle stored in code buffer 302 that is to be superimposed on the video picture. In other words, the "skip" operation results in the non-presentation of a subtitle stored in code buffer 302, as illustrated in Table 2.

TABLE 2

| | state | RPA | PSA1 | PSA2 | PSA3 | |
|---|---|---|---|---|---|---|
| | S1 | 0 | 0 | 0 | 0 | |
| | S2 | * | * | * | * | |
| | S3 | * | * | * | * | |
| | | 1 | * | * | * | |
| | | 2 | * | * | * | |
| | | . . | * | * | * | outputting PTSS and PTSE for PH0 |
| | | . . | * | * | A1 | |
| P0 decode instruction → | S4 | h | * | * | * | |
| | S5 | 0 | * | * | * | |
| | | 1 | * | * | * | |
| | | 2 | * | * | * | |
| | | . . | * | * | * | |
| | S6 | h | * | * | * | |
| | S7 | . . | * | * | * | P0 decoding and presentation (F1 field) |
| | S8 | . . | * | * | * | |
| | S6 | . . | * | * | * | |
| | S7 | . . | * | * | * | P0 decoding and presentation (F2 field) |
| | S8 | A1 | * | * | * | |
| | S2 | * | * | * | * | |
| | S3 | A1 | * | A1 | * | |
| | | A1 + 1 | * | * | * | |
| | | . . | * | * | * | outputting PTSS and PTSE for PH1 |
| | | . . | * | * | A2 | |
| P1 skip → | S4 | * | * | * | * | |
| | S5 | 0 | * | * | * | |
| | | 1 | * | * | * | |
| | | 2 | * | * | * | |
| | | . . | * | * | * | |
| | S6 | h | * | * | * | |
| | S7 | . . | * | * | * | P0 decoding and presentation (F1 field) |
| | S8 | . . | * | * | * | |
| | S6 | . . | * | * | * | |
| | S7 | . . | * | * | * | P0 decoding and presentation (F2 field) |
| | S8 | A1 | * | * | * | |
| | S2 | * | * | * | * | |
| | S3 | A2 | * | A2 | * | |
| | | A2 + 1 | * | * | * | |
| | | . . | * | * | * | outputting PTSS and PTSE for PH2 |
| | | . . | * | * | A3 | |
| P2 decode instruction → | S4 | A2 + h | * | * | * | |
| | S5 | A2 | A2 | * | * | |
| | | A2 + 1 | * | * | * | |
| | | A2 + 2 | * | * | * | |
| | | . . | * | * | * | |
| | | . . | * | * | * | |
| | S6 | A2 + h | * | * | * | |

TABLE 2-continued

<table>
<tr><td colspan="6">VALUE FOR EACH ADDRESS REGISTER</td></tr>
<tr><td>state</td><td>RPA</td><td>PSA1</td><td>PSA2</td><td>PSA3</td><td></td></tr>
<tr><td>S7</td><td>*</td><td>*</td><td>*</td><td>*</td><td>P2 decoding and presentation (F1 field)</td></tr>
<tr><td></td><td>A2 + h + 1</td><td>*</td><td>*</td><td>*</td><td></td></tr>
<tr><td></td><td>. .</td><td>*</td><td>*</td><td>*</td><td></td></tr>
<tr><td></td><td>. .</td><td>*</td><td>*</td><td>*</td><td></td></tr>
</table>

As shown in Table 2, the operation of the subtitle decoder of the present invention is the same as that previously discussed with reference to FIGS. 6A to 6D until a "P1 skip" instruction is supplied by host controller 124 in, for example, state S4. In this instance, the value A1 stored as page start address PSA2 is not stored as page start address PSA1, and instead, the value A2 from page start address PSA2 is stored as read pointer address RPA in state S3. Page header PH2 then is pre-read from code buffer 302 in state S3 and upon receiving a P2 decode instruction from host controller 124, page header PH2 and the character data of page P2 stored are read in states S5 and S7, respectively, as shown in FIG. 11B. The ensuing operations of the subtitle decoder of the present invention are carried out in a manner similar to that previously discussed with reference to Table 1. Thus, subtitle page P1 effectively is "skipped" in response to a skip instruction from the host controller. Furthermore, multiple subtitle pages may be skipped in a similar manner.

The "half reset" operation, previously mentioned, involves the discarding of all of the pages of subtitle data stored in code buffer 302 except the subtitle page currently being read therefrom and superimposed on the video picture. The half reset operation is discussed with reference to FIGS. 11C and 11D of the drawings and Table 3, shown below.

TABLE 3

<table>
<tr><td colspan="2"></td><td colspan="5">VALUE FOR EACH ADDRESS REGISTER</td></tr>
<tr><td></td><td>state</td><td>RPA</td><td>PSA1</td><td>PSA2</td><td>PSA3</td><td></td></tr>
<tr><td></td><td>S1</td><td>0</td><td>0</td><td>0</td><td>0</td><td></td></tr>
<tr><td></td><td>S2</td><td>*</td><td>*</td><td>*</td><td>*</td><td></td></tr>
<tr><td></td><td>S3</td><td>*</td><td>*</td><td>*</td><td>*</td><td></td></tr>
<tr><td></td><td></td><td>1</td><td>*</td><td>*</td><td>*</td><td></td></tr>
<tr><td></td><td></td><td>2</td><td>*</td><td>*</td><td>*</td><td></td></tr>
<tr><td></td><td></td><td>. .</td><td>*</td><td>*</td><td>*</td><td>outputting PTSS and PTSE for PH 0</td></tr>
<tr><td></td><td></td><td>. .</td><td>*</td><td>*</td><td>A1</td><td></td></tr>
<tr><td>P0 decode instruction →</td><td>S4</td><td>h</td><td>*</td><td>*</td><td>*</td><td></td></tr>
<tr><td></td><td>S5</td><td>0</td><td>*</td><td>*</td><td>*</td><td></td></tr>
<tr><td></td><td></td><td>1</td><td>*</td><td>*</td><td>*</td><td></td></tr>
<tr><td></td><td></td><td>2</td><td>*</td><td>*</td><td>*</td><td></td></tr>
<tr><td></td><td></td><td>. .</td><td>*</td><td>*</td><td>*</td><td></td></tr>
<tr><td></td><td>S6</td><td>h</td><td>*</td><td>*</td><td>*</td><td></td></tr>
<tr><td></td><td>S7</td><td>*</td><td>*</td><td>*</td><td>*</td><td>P0 decoding and presentation (F1 field)</td></tr>
<tr><td></td><td></td><td>h + 1</td><td>*</td><td>*</td><td>*</td><td></td></tr>
<tr><td></td><td></td><td>. .</td><td>*</td><td>*</td><td>*</td><td></td></tr>
<tr><td></td><td>S8</td><td>. .</td><td>*</td><td>*</td><td>*</td><td></td></tr>
<tr><td></td><td>S6</td><td>. .</td><td>*</td><td>*</td><td>*</td><td></td></tr>
<tr><td></td><td>S7</td><td>. .</td><td>*</td><td>*</td><td>*</td><td>P0 decoding and presentation (F2 field)</td></tr>
<tr><td></td><td>S8</td><td>A1</td><td>*</td><td>*</td><td>*</td><td></td></tr>
<tr><td></td><td>S2</td><td>*</td><td>*</td><td>*</td><td>*</td><td></td></tr>
<tr><td></td><td>S3</td><td>A1</td><td>*</td><td>A1</td><td>*</td><td></td></tr>
<tr><td></td><td></td><td>A1 + 1</td><td>*</td><td>*</td><td>*</td><td></td></tr>
<tr><td></td><td></td><td>. .</td><td>*</td><td>*</td><td>*</td><td>outputting PTSS and PTSE for PH 1</td></tr>
<tr><td></td><td></td><td>. .</td><td>*</td><td>*</td><td>A2</td><td></td></tr>
<tr><td></td><td>S4</td><td>A1 + h</td><td>*</td><td>*</td><td>*</td><td></td></tr>
<tr><td></td><td>S5</td><td>0</td><td>*</td><td>*</td><td>*</td><td></td></tr>
<tr><td></td><td></td><td>. .</td><td>*</td><td>*</td><td>*</td><td></td></tr>
<tr><td></td><td>S6</td><td>h</td><td>*</td><td>*</td><td>*</td><td></td></tr>
<tr><td></td><td>S7</td><td>*</td><td>*</td><td>*</td><td>*</td><td>P0 decoding and presentation (F1 field)</td></tr>
<tr><td></td><td></td><td>. .</td><td>*</td><td>*</td><td>*</td><td></td></tr>
<tr><td></td><td>S8</td><td>. .</td><td>*</td><td>*</td><td>*</td><td></td></tr>
<tr><td></td><td>S6</td><td>. .</td><td>*</td><td>*</td><td>*</td><td></td></tr>
<tr><td></td><td>S7</td><td>. .</td><td>*</td><td>*</td><td>*</td><td>P0 decoding and presentation (F2 field)</td></tr>
<tr><td></td><td>S8</td><td>A1</td><td>*</td><td>*</td><td>*</td><td></td></tr>
<tr><td></td><td>S2</td><td>*</td><td>*</td><td>*</td><td>*</td><td></td></tr>
<tr><td>half reset →</td><td>S4</td><td>*</td><td>*</td><td>*</td><td>*</td><td></td></tr>
<tr><td></td><td>S5</td><td>0</td><td>*</td><td>*</td><td>*</td><td></td></tr>
<tr><td></td><td></td><td>1</td><td>*</td><td>*</td><td>*</td><td></td></tr>
<tr><td></td><td></td><td>. .</td><td>*</td><td>*</td><td>*</td><td></td></tr>
<tr><td></td><td>S6</td><td>h</td><td>*</td><td>*</td><td>*</td><td></td></tr>
<tr><td></td><td>S7</td><td>*</td><td>*</td><td>*</td><td>*</td><td>P0 decoding and presentation (F1 Field)</td></tr>
<tr><td></td><td></td><td>. .</td><td>*</td><td>*</td><td>*</td><td></td></tr>
<tr><td></td><td>S8</td><td>. .</td><td>*</td><td>*</td><td>*</td><td></td></tr>
<tr><td></td><td>S6</td><td>. .</td><td>*</td><td>*</td><td>*</td><td></td></tr>
</table>

TABLE 3-continued

VALUE FOR EACH ADDRESS REGISTER

| | state | RPA | PSA1 | PSA2 | PSA3 | |
|---|---|---|---|---|---|---|
| | S7 | .. | * | * | * | P0 decoding and presentation (F2 field) |
| | | .. | * | * | * | |
| | S8 | A1 | * | * | * | |
| | S2 | * | * | * | * | |
| | S3 | A2 | * | A2 | * | |
| | | A2 + 1 | * | * | * | |
| | | .. | * | * | * | outputting PTSS and PTSE of PH 5 |
| | | .. | * | * | A3 | |
| P5 decode instruction→ | S4 | A2 + h | * | * | * | |
| | S5 | A2 | A2 | * | * | |
| | | A2 + 1 | * | * | * | |
| | | .. | * | * | * | |
| | | .. | * | * | * | |
| | S6 | A2 + h | * | * | * | |
| | S7 | * | * | * | * | P5 decoding and presentation (F1 field) |
| | | A2 + h + 1 | * | * | * | |

As shown in Table 3, the operation of the subtitle decoder of the present invention from state S1 until a half reset instruction is supplied is shown in FIGS. 6A to 6D, as previously discussed. Upon receiving the half reset instruction, the value A2 of page start address PSA3 is stored as write pointer address WPA, such as shown in FIG. 11C. Hence, the next page P5 of subtitle data supplied to code buffer 302 is stored at address A2, as shown in FIG. 11D. Page header PH5 is pre-read from code buffer 302 in state S3, as shown in Table 3, and when host controller 124 supplies a P5 decode instruction, header PH5 and character data of subtitle page P5 are read from code buffer 302 in states S5 and S7, respectively. Thus, subtitle data stored in code buffer 302 from address A1 to address A2 is not read out. However, if a half reset instruction is received when page start address PSA3 still equals A1 (i.e., prior to changing to A2), write pointer address WPA is made equal to the address value A1 and the unread region shown in FIG. 11D is not produced.

As is clear from the above discussion, the maximum number of pages of subtitle data that can be stored in code buffer 302 does not need to be predetermined since each page stored therein is read therefrom only as it is needed, and since the header of a subtitle page subsequently to be superimposed on the video picture is pre-read from code buffer 302, the various information contained therein allows the subtitle decoder to simply identify at which times the subtitle to be successively displayed will be displayed. Hence, management of stored pages of subtitle data is easily accomplished even when a relatively large number of pages of subtitle data are stored therein.

While the present invention has been particularly shown and described in conjunction with the preferred embodiments thereof, it will be readily appreciated by those of ordinary skill in the art that various changes may be made without departing from the spirit and scope of the invention. For example, although the subtitle decoder of the present invention has been described as reading from memory a header of a subtitle page between times T2 and T1 shown in FIG. 8A, the present invention is not limited to this specific embodiment and may perform such pre-reading at other times which are outside the effective field of the picture, for example, the region "x" shown in FIG. 8B.

As another example, although the present discussion is directed to a subtitle decoder, the present invention is not limited solely to subtitles and may be widely applied to the decoding of other types of signals, for example, image data that are arranged in page units.

Therefore, it is intended that the appended claims be interpreted as including the embodiments described herein, the alternatives mentioned above, and all equivalents thereto.

What is claimed is:

1. Apparatus for decoding an information page having header information and page data, comprising:

means for receiving at least one information page each having header information and page data, said page data representing information to be combined with a video image;

storage means for storing each received information page as a respective page therein, said storage means being controllable to read out selected stored data;

means for detecting the header information after being stored as one of the pages of said storage means;

control means for controlling said storage means to read out the detected header information a first time outside the effective field of the video image, and for controlling said storage means to read out in real time, at a time in accordance with presentation time data included in the first time read out header information, the detected header information a second time and the stored page data corresponding to said detected header information; and means for decoding the read out page data and supplying the decoded read out page data as an output.

2. The apparatus of claim 1, wherein said page data represents a subtitle to be superimposed on said video image and said header information includes presentation time data identifying a time at which said subtitle is to be superimposed on said video image, and location data identifying a location in said video image at which said subtitle is to be located.

3. The apparatus of claim 2, wherein said control means is operable to control said storage means to read out the page data at a time in accordance with said presentation time data included in the first time read out header information.

4. The apparatus of claim 2, wherein said means for decoding supplies the decoded read out page data as an output to be combined with said video image in an effective field thereof; said means for detecting is operable to detect the header information of a successive page stored in said storage means; and said control means controls said storage means to read out, the first time, the detected header information of the successive page stored in said storage means at a time corresponding to outside the effective field of said video image.

5. The apparatus of claim 4, wherein said control means is operable to control said storage means to read out, at a time in accordance with presentation time data included in the header information of the successive page, the page data of the successive page stored in said storage means.

6. The apparatus of claim 5, further comprising means for receiving a skip instruction; and wherein said control means is operable to control said storage means to not read the page data of the successive page stored in said storage means in response to the skip instruction.

7. The apparatus of claim 1, wherein said control means is operable to control said storage means to begin reading out the detected header information of one of the pages stored in said storage means a first time only after all of the header information of said one of the pages is stored in said storage means.

8. The apparatus of claim 1, wherein said control means includes an address memory for storing first, second and third page addresses representing locations in said storage means at which first, second and third information pages, respectively, are stored, said first, second and third information pages each including respective header information and page data; and said control means being operable to control said storage means to read out one of said information pages stored in said storage means in accordance with one of said first, second, and third page addresses.

9. The apparatus of claim 1, wherein the amount of data included in each page of said storage means is variable and established in accordance with an amount of data of an information page stored therein.

10. The apparatus of claim 1, wherein said storage means is a ring-type memory device.

11. The apparatus of claim 1, further comprising means for detecting an error in an information page being stored in said storage means; and wherein said control means is operable to control said storage means to overwrite said information page stored therein having the detected error with a new information page received by said means for receiving.

12. The apparatus of claim 1, further comprising means for receiving a half reset instruction; and wherein said control means is operable, in response to the half reset instruction, to control said storage means to overwrite with newly received information pages every page stored therein except the sage of the page data currently read from the storage means and decoded by said means for decoding.

13. Method of decoding an information page having header information and page data, comprising:

receiving at least one information page each having header information and page data, said page data representing information to be combined with a video image;

storing each received information page in a memory as a respective page therein;

detecting the header information after being stored as in one of the pages of the memory;

reading from the memory, a first time, outside the effective field of the video image, the detected header information;

reading from the memory in real time, at a time in accordance with presentation time data included in the first time read out header information, the detected header information a second time and the stored page data corresponding to the detected header information;

decoding the read out page data; and supplying the decoded read out page data as an output.

14. The method of claim 13, wherein the page data represents a subtitle to be superimposed on the video image and the header information includes presentation time data identifying a time at which said subtitle is to be superimposed on said video image, and location data identifying a location in the video image at which the subtitle is to be located.

15. The method of claim 14, wherein the second reading step is carried out by reading from the memory the page data at a time in accordance with the presentation time data included in the first time read out header information.

16. The method of claim 14, further comprising the step of combining the decoded read out page data with the video image in an effective field thereof; said detecting step is carried out by detecting the header information of a successive page stored in the memory; and the first reading step is carried out by reading from memory the detected header information of the successive page stored therein at a time corresponding to outside the effective field of the video image.

17. The method of claim 16, wherein the second reading step is carried out by reading from memory, at a time in accordance with presentation time data included in the header information of the successive page, the page data of the successive page stored therein.

18. The method of claim 17, further comprising the step of receiving a skip instruction; and wherein said second reading step does not read from memory the page data of the successive page stored therein when the skip instruction is received.

19. The method of claim 13, wherein said first reading step is carried out by reading out the detected header information of one of the pages stored in the memory only after all of the header information of said one of the pages is stored in the memory.

20. The method of claim 13, wherein the amount of data included in each page of the memory is variable and established in accordance with an amount of data of an information page stored therein.

21. The method of claim 13, wherein the memory is a ring-type memory device.

22. The method of claim 13, further comprising the step of detecting an error in an information page being stored in the memory; and wherein said storing step is carried out by overwriting the information page stored in the memory having the detected error with a new information page received by said step of receiving.

23. The method of claim 13, further comprising the step of receiving a half reset instruction; and wherein said storing step is carried out, when the half reset instruction is received, by overwriting with newly received information pages every page stored in the memory except the page of the page data being read in the second reading step.

* * * * *